United States Patent [19]

Freeman et al.

[11] Patent Number: 4,473,589
[45] Date of Patent: Sep. 25, 1984

[54] PROTEIN LIQUEFICATION PROCESS AND PRODUCTS

[76] Inventors: Leon D. Freeman, 101 Casa Buena Dr., Corte Madera, Calif. 94925; James W. Sawhill, 20803 Bryant St., Canoga Park, Calif. 91306

[21] Appl. No.: 374,213

[22] Filed: May 3, 1982

Related U.S. Application Data

[63] Continuation-in-part of Ser. No. 256,417, Apr. 22, 1981, abandoned.

[51] Int. Cl.³ .................. A23J 1/02; A23J 1/04; A23J 1/10; A23J 1/18
[52] U.S. Cl. .................................. 426/7; 426/32; 426/56; 435/69
[58] Field of Search ............ 426/7, 32, 55, 56; 435/69, 175

[56] References Cited

U.S. PATENT DOCUMENTS

| | | | |
|---|---|---|---|
| 2,431,256 | 11/1947 | Keil et al. | 252/352 |
| 2,477,255 | 7/1949 | Keil et al. | 426/32 X |
| 3,578,461 | 5/1971 | Weeks et al. | 435/69 X |
| 3,891,770 | 6/1975 | Sato et al. | 426/32 |
| 3,924,005 | 12/1975 | Bosund et al. | 426/7 |
| 4,036,993 | 7/1977 | Ikeda et al. | 426/7 |
| 4,081,555 | 3/1978 | Sawhill | 426/2 |
| 4,220,723 | 9/1980 | Eckmayer et al. | 426/56 X |

Primary Examiner—Robert A. Yoncoskie
Attorney, Agent, or Firm—Townsend and Townsend

[57] ABSTRACT

Sources of protein, such as residues and waste products from processing fish, poultry, pork and beef as well as single cell microorganisms, are hydrolyzed to provide liquid products containing substantially all of the component amino acids, lipids and phosphorus in metabolically useful form. The process involves a brief alkaline treatment with heat (120°–170° F.) and alkali (pH 12 or above) which facilitates liquefication and enhances susceptibility to subsequent enzyme hydrolysis with bacterial proteinase at elevated temperatures (100°–140° F.). Cell rupture and protein denaturation occur during alkaline treatment and permit and facilitate the enzyme to rapidly break down the intact proteins to smaller, more soluble molecules. The product may be preserved with various acids at a pH of 3.8 to 4.2.

14 Claims, No Drawings

PROTEIN LIQUEFICATION PROCESS AND PRODUCTS

This application is a continuation-in-part of patent application Ser. No. 256,417 filed Apr. 22, 1981, now abandoned.

BACKGROUND OF THE DISCLOSURE

This invention relates to the liquefication of animal tissues of all types, and single cell microorganisms. More particularly, it relates to a dual stage treatment of such materials, first with heat and under alkaline conditions, and then with proteolytic enzymes with heat and under alkaline conditions, to provide products containing protein hydrolysates, lipids and phosphorous in solution useful as feed supplements and/or as fertilizers.

While it is well known that many protein-containing materials of plant and animal origin (including microorganisms) can be partially or totally solubilized by treatment with caustic soda, or other strong alkalies, it requires high concentration of the alkaline substance and extensive heating, usually at the boiling point. The degradation of the protein which occurs often leads to isomerization of the amino acids, deamination, and the loss of sulfur from sulfur-containing amino acids. The nutritional value of the materials is therefore substantially reduced.

It is also known that many protein-containing substances can be hydrolyzed to some extent, and therefore partially liquefied by the use of available proteolytic enzymes now in commerce. In many cases, the degree of digestion is incomplete. Many types of cells cannot be ruptured by this approach. Due to inactivation of the enzyme, the digestions usually must be carried out at ambient temperatures of 34°-45° C. At higher temperatures, inactivation of the enzymes can occur. Very long periods of digestion may produce useful products. To accelerate the action, larger amounts of enzyme may be used to help drive the reaction. In some cases it may be possible to achieve complete liquefication; however, such a process would not be economical or practical.

The products which result from the above manipulations are known as peptones, peptides, and if hydrolysis has proceeded far enough, free amino acids. The nature of the products will depend upon the enzymes used. Such products currently are used in feed, as fermentation ingredients, in foods, and in bacteriological media.

Typical of the prior art patents in this area are two patents to Keil, et al., U.S. Pat. Nos. 2,431,256 and 2,477,255. These patents describe a protein hydrolysis under severe conditions of alkalinity and termperature which result in a degradation of the amino acid quality of the end products. Sato, et al., U.S. Pat. No. 3,891,770, describes a waste water treatment procedure in which protein and fat are concentrated with the assistance of a polyacrylate precipitating agent to prepare a froth. The patent to Bosund, et al., U.S. Pat. No. 3,924,005, describes a totally enzymatic process for solubilizing fish proteins. In contrast to these patents and other prior art, the present process utilizes a mild and rapid saponification at pH about 12, followed by enzymatic hydrolysis that results in a liquid product soluble across the full pH range, and in which the amino acids, lipids and phosphorous have not been harmed by the treatment, but remain in a metabolically useful form.

SUMMARY OF THE INVENTION

In accordance with the present invention there is provided a process for liquefying the protein, lipids and phosphorous in a protein source selected from any animal tissue and single cell microorganisms comprising the steps of:

(a) heating an aqueous slurry of said source at a pH above 12 and at a temperature of about 120°-170° F. for a relatively brief period of time sufficient to facilitate and promote subsequent enzyme hydrolysis of the proteins, and liberation of the lipids and phosphorous;

(b) and then promptly hydrolyzing said source to liquefy the protein therein by heating said slurry at about 100°-140° F. at an alkaline pH in the presence of an effective amount of proteolytic enzyme.

In the preferred embodiment, step (a) is executed in about 5-60 minutes, frequently in about 20-40 minutes, at a temperature of about 140°-160° F. and at a pH above 12. However, the process broadly encompasses times from just bringing the slurry up to the desired temperature of 120°-170° F. and immediately proceeding with step (b) to holding at 120°-170° F. for up to 120 minutes. The particular conditions selected will be governed by the end use of the product and the nature of the process equipment in use.

In most instances the goal is to complete both steps (a) and (b) in not more than about 24 hours. In the preferred embodiment the hydrolysate of the process is treated by adding a preservative and adjusting the pH to about 3.8-4.2. The preservative is at least one substantially nontoxic carboxylic acid or substantially nontoxic salt thereof, the carboxylic acid being selected from unsaturated and saturated aliphatic carboxylic acids and aromatic carboxylic acids.

DESCRIPTION OF THE PREFERRED EMBODIMENT

As indicated, the invention consists of two primary steps which are properly integrated:

1. The first step is the saponification step. It is designated to facilitate liquefication and enhance susceptibility of the slurry to subsequent enzyme hydrolysis. This is accomplished in part by causing cell rupture and protein denaturation which permits more rapid enzyme breakdown of intact proteins to smaller, more soluble molecules. The step involves the addition of chemicals capable of raising the pH to above 12, perferably about 12-13. The amount of base required will vary depending upon the alkali used and the starting protein source materials. Using sodium hydroxide, the amount of base will usually be between 1-5% by weight, to achieve the proper pH. Similar amounts of other useful bases can be used, such as potassium hydroxide and ammonium hydroxide. Other alkaline substances may perform satisfactorily in the process but may be unacceptable for toxicity reasons, depending on the end use of the product.

2. The second step is the enzymatic hydrolysis stage. In general, any proteolytic enzyme may be employed, but preferred enzymes are of bacterial origin. The enzymes found to be most effective to date are commercially available from Gist-Brocades NV of Holland, and G.B. Fermentation Industries, United States. In particular, those companies offer high alkaline, alkaline and neutral proteases of bacterial origin under the trademark MAXATASE in Europe, or Alkaline Protease 201D, or Neutral Protease 200, or Highly Alkaline Protease in the United States. The latter three enzymes have been utilized in the experimental work reported below.

In the preferred embodiment the enzyme hydrolysis is executed at elevated temperature of about 100°–140° F., preferably about 115°–125° F.

Alternative procedures are contemplated for the enzyme hydrolysis step. At the conclusion of the first saponification stage the pH will have dropped below the starting 12–13 range but will still be strongly alkaline. In one embodiment it is contemplated that a high alkaline protease will be added at the end of the first stage at the pH then existing in the slurry.

As the enzyme hydrolysis proceeds, carboxylic groups of the protein are increasingly liberated, thereby lowering the pH. If the protein source requires it for rapid and complete liquefication, a plurality of enzymes can be successively introduced as hydrolysis of the source progresses, with each successive enzyme added being selected for its activity at the successively lowered pHs of the slurry. Thus, the high alkaline protease may be followed by the addition of a neutral protease. Where needed to achieve the optimum pH, sulfuric acid or other suitable acid can be used.

The high alkaline protease is generally optimally active at a pH of around 10–11; the alkaline protease is generally optimally active at a pH of about 8–10; and the neutral protease is generally optimally active at a pH of about 6–8.

An alternative embodiment is to immediately lower the pH at the end of the first saponification stage by the addition of a mineral acid before adding the enzyme. For example, a suitable acid compatible with the utility of the end product, such as hydrochloric, phosphoric or sulfuric acid, is added to lower the pH to about 8–10, and then an alkaline protease may be added for the enzyme hydrolysis.

Another alternative is to add both an alkaline protease and a neutral protease after the pH is lowered with acid. The choice of these alternatives will generally be made based upon the nature of the starting protein source and the ease of its hydrolysis. For example, high keratin content materials, such as feathers, may require more treatment than soft fleshy materials.

The amount of enzyme utilized is that necessary and effective to complete the hydrolysis and liquefy the protein within the desired time limits. The amount of enzyme will vary, depending upon the concentration of enzyme in its formulation and the method of manufacture of enzyme. Usually the amount of enzyme, as it is formulated by the manufacturer, used in the enzyme hydrolysis step will be about 0.1–1.0 weight percent of the weight of the starting protein source. The amount of enzyme to be used is based upon the materials available at the time that these studies were performed. If more highly purified preparation were available or needed, smaller amounts of enzyme would be required. With less purified preparations, which may be completely suitable for this purpose, larger amounts of enzyme would be needed.

3. A preferred third stage for the process is directed to preservation of the hydrolysate and comprises the addition of a preservative thereto. Optimal results have been obtained wherein preservation is accomplished by adjusting the pH of the hydrolysate of the second stage with a suitable mineral acid such as phosphoric acid, sulfuric acid or hydrochloric acid to less than about 4.2, and preferably in the range of about 3.8–4.2, and adding about 0.05–1.0 weight percent of solids of at lease one substantially non-toxic carboxylic acid or substantially non-toxic salt thereof, said carboxylic acid being selected from solid unsaturated aliphatic carboxylic acids and aromatic carboxylic acids. The preservative system of the present process is the same as that more fully described in Shawhill U.S. Pat. No. 4,081,555, the disclosure of which is incorporated herein by reference. In the Sawhill patent, the preferred preservatives are classes of carboxylic acids, which include benzoic or sorbic acid. In this invention we have been shown the usefulness of proprionic acid as a single or sole preservative agent.

In the practice of the present method, and although not necessarily needed, a preliminary mechanical breakdown of the protein source, such as by coarse grinding, may facilitate the process. Mixing may promote the desired reactions.

The primary end product sought is a liquefied protein, lipid and phosphorous solution or emulsion. Depending upon the starting material, the fats may be the most valuable products obtained. For example, where the starting protein source material contains a significant amount of fatty material, the fatty materials may be separated following enzyme hydrolysis, such as by high speed centrifugation. If such a separation is accomplished while the pH is on the alkaline side, an additional benefit can be obtained in that the fats are relatively free of fatty acids. Following acidification of the hydrolysate, free fatty acids can be removed by centrifugation if present to any degree. The present process thus may provide a new method for wet rendering to prepare very high quality commercial fats. If isolated on the alkaline side, the quality will be even higher because of the low fatty acid content of the final product. The process in this regard is particularly applicable to beef, pork, sheep, chickens and other large volume animal tissue.

Materials which are not removed as liquefied protein or fat, such as residual skeletal material and some very resistant connective tissue, can be removed either by centrifugation or by a separate screening process.

Typical source starting materials for the present process are as follows:

1. animal blood,
2. fish wastes, including whole trash fish, fish left after filleting, fish solubles, fish intestines, and any other material which is a byproduct of the fishing industry and fish processing,
3. poultry wastes of all types, including blood, internal organs, feathers, beaks, heads, and feet, whole birds (DOA's) and eggs,
4. pork skins or other pork residues, including all internal organs, containing protein and fats, or any pork tissues or byproducts or organs,
5. beef tissues, such as beef intestines, or other waste products, including all internal organs, derived from beef manufacture containing proteins and fats,
6. cakes consisting of microorganisms, such as those obtained as a byproduct of the manufacture of monosodium glutamate (MSG) or other products produced by fermentation, including the organisms producing citric acid, and organisms producing many different commercial enzymes,
7. yeast in the form of fresh cake. The process is applicable to all types of yeast—baker's and brewers, as well as to fresh and dry yeast, and yeast from any fermentation, 8. single cell microorganisms in general, including bacteria, molds, yeasts and algae.

The following examples will illustrate the process and products of the invention.

EXAMPLE I

Liquefication of Bacterial cell from the Production of Monosodium Glutamate

Monosodium glutamate is produced by bacteria. After the production is complete the broths are centrifuged to produce a substance known as "cell cream". This is a paste containing 14–18% solids and cannot be obtained in higher concentrations, since this represents the actual cell volume. The product spoils extremely rapidly. It has been shown to be essentially ineffective in feeding trials in dogs and cats, and for this reason is forbidden for use in dog food by the State of California. It may have value in ruminant nutrition, but this has not been established.

The tests in this example were conducted on material which had been dried because of the rapid rate of spoilage of this preparation. Tests on wet cakes indicated that the same results can occur.

In this example the difference between treatment with sodium hydroxide alone (alkaline treatment), enzymatic digestion alone, and the sequential process of this invention are compared. The differences between the products produced are described.

Treatment a. Alkaline Treatment Alone 400 gm of water and 30 gm of 50% sodium hydroxide were mixed and, with agitation, 150 gm of cell cream was added to make a 25% suspension. At 180° F., 20 ml more of water and 5 gm of NaOH were added. This made a final concentration of 50% sodium hydroxide of 5%. The mixture was held at 170° F. for 1.5 hours.

200 ml of the mixture was removed as the starting material for treatment c. below. The balance was then placed in a 130° F. incubator for 48 hours.

b. Enzymatic Digestion Alone

A cell cream suspension was prepared from 10 gm of dried cell cream and 90 ml of water. This was adjusted to pH 10.5 with sodium hydroxide and 0.5 ml of high alkaline protease added. The mixture was incubated until 48 hours had elapsed, at 130° F.

c. Alkaline Treatment Followed by Enzymatic Digestion

The 200 ml of alkaline-treated material, taken from treatment Ia., above, was adjusted to pH 10.5 with sulfuric acid and 1 ml of high alkaline protease was added. This mixture was held at 130° C. for 48 hours.

After 48 hours, all three samples were removed from the incubator and allowed to cool to room temperature. Each was examined and the results of this examination are shown in Table 1.

TABLE 1

| Sample No. and Treatment | Odor | Final pH |
| --- | --- | --- |
| 1(a) Alkaline treatment only | ammonia | 10.0 |
| 1(b) Enzymatic treatment only | spoiled | 7.5 |
| 1(c) Alkaline treatment, then Enzymatic treatment | O.K. | 9.5 |

To each of the three preparations, sufficient potassium sorbate was added to make 0.1%. The pH was then adjusted to 4.0 with sulfuric acid. The results are as follows, described in Table 2.

TABLE 2

| Effects of Acidification | |
| --- | --- |
| Sample No. and Treatment | Observation and Results |
| 1(a) Alkaline treatment only | Gelled - Viscosity rose to 100,000 cp, then reduced to 27,000 cp at pH 4. |
| 1(b) Enzymatic treatment only | No thickening. |
| 1(c) Alkaline treatment, then Enzymatic treatment | Some gelling at pH 6 - reduced to 600 cp at pH 4. |

After standing overnight, each sample was adjusted to 10% total solids. A control was prepared, consisting of a 10% cell cream suspension in water, untreated. A packed cell volume was determined by centrifugation of five minutes at high speed in a clinical laboratory centrifuge. The results are shown in Table 3.

TABLE 3

| Sample No. and Treatment | PCV |
| --- | --- |
| 1(a) Alkaline | 5.8 ml 42% |
| 1(b) Enzymatic | 6.7 ml 48% |
| 1(c) Combination | 1.5 ml 11% |
| Control (untreated) | 9.4 ml 67% |

While both the alkaline treatment and the enzymatic treatment alone produced some reduction in cell volume from the untreated control, the reduction was small compared to the effects observed in the combined process. Using the data shown in Table 3, the effects of the three approaches can be shown in Table 4.

TABLE 4

| Degree of Hydrolysis | |
| --- | --- |
| Sample No. and Treatment | % Hydrolysis |
| 1(a) Alkaline | 38% |
| 1(b) Enzymatic | 29% |
| 1(c) Combination | 84% |

Discussion of Results

The alkaline treatment (1a) was a relatively moderate treatment. The elevated pH was maintained for 48 hours, 1.5 hours at 170° F. and the balance at 137° F. The presence of ammonia seemed to indicate destruction of some of the amino acids. The gelling after acidification indicates relatively modest amount of hydrolysis. Even though the viscosity at pH 4 drops to 27,000 cp, it is too high for most practical uses. Furthermore, the data suggest that perhaps only 40% of the protein has really been made available by this process.

In the enzymatic approach (1b), there are two obvious problems:

1. The solution was spoiled, which is typical of this product during hydrolysis.

2. The level of hydrolysis was not really sufficient to provide the protein in an available soluble form.

The combined alkaline treatment followed by enzymatic hydrolysis (1c) was effective and appeared to cause very little breakdown of proteins, as evidenced by the absence of ammonia. The pH lowering caused some thickening, but there was a highly manageable solution at pH 4. Digestion was almost complete and substantially greater than occurred under alkaline treatment or enzymatic treatment alone.

EXAMPLE II

Digestion of Whole Fish

In this example whole anchovies were used. A comparison of alkaline treatment, enzyme treatment and the combination was made. In subsequent studies, the carcasses of whole fish (with the fillet removed) were processed with the sequential treatment and the product is described in EXAMPLE IV.

Treatment Procedures 1. 4.3 kg of anchovies were mixed with 260 gm of 50% liquid sodium hydroxide (final concentration, 5.7%).
2. With agitation, the temperature was raised to 170° F. for 45 minutes. The result was a completely liquefied mixture, without homogenization.
3. An aliquot was removed, consisting of 200 gm, and held at 131° F. for 48 hours. (Sample No. 1)
4. The balance was cooled to 125° F., and adjusted to pH 10 with sulfuric acid.
5. High alkaline protease was added to make a concentration of 0.5%. The mixture was held at 131° F. for 48 hours. (Sample No. 2)
6. 69 gm of anchovies were homogenzied, alkaline protease added at a level of 0.5%, and pH adjusted to 10 with 0.4 ml sodium hydroxide 50%. (Sample No. 3)
7. Under identical conditions, 60 gm of fish were cut up into chunks and were incubated with 0.4 ml of sodium hydroxide for one hour. Enzyme was then added to a level of 0.5%, and the mixture was incubated at 131° F. for 48 hours. (Sample No. 4)

Results

The materials were examined, as is, for pH, odor and appearance. The results are described in Table 5.

The preparation was acidified with sulfuric acid to pH 4 with 0.1% sorbate added. The results are shown in Table 6.

TABLE 5

| Sample No. and Treatment | pH (48 hours) | Smell | Description |
| --- | --- | --- | --- |
| 1. Alkaline treatment only | 10.4 | Ammonia | Fluid |
| 2. Alkaline, then enzyme treatments | 9.0 | O.K. | Very fluid - very small residue |
| 3. Enzyme treatment - homogenate | 7.1 | O.K. | Fluid - large residue |
| 4. Enzyme treatment - chunks | 6.7 | O.K. | Fluid - 50% of chunks remaining |

TABLE 6

| Effect of Lowering pH | |
| --- | --- |
| Sample No. and Treatment | Effect Observed |
| 1. Alkaline treatment only | Formed solid mass |
| 2. Alkaline, then enzyme treatment | Low viscosity with little suspended solids |
| 3. Enzyme treatment - homogenate | Low viscosity - substantial solids |
| 4. Enzyme treatment - chunks | Low viscosity - disintegrated chunk - substantial solids |

The acidified and preserved samples were allowed to stand for 24 hours. Each was centrifuged for five minutes at high speed to determine the amount of solids.

TABLE 7

| | | Results of Centrifuge Study (14 ml samples) | | |
| --- | --- | --- | --- | --- |
| No. | Description | % Fish in Prep. | Volume | % Solids | % of Whole Fish |
| 1. | Alkaline treatment only | 100 | Too thick to run | | |
| 2. | Alkaline treatment, then enzymatic | 100 | 3 ml | 21 | 21 |
| 3. | Enzymatic treatment of homogenate | 58 | 7 ml | 50 | 16 |
| 4. | Enzymatic treatment on chunks | 55 | 5.7 ml | 41 | 15 |

Results

1. Alkaline Treatment only. This treatment lasted for about one hour at 170° F. and 46 hours at 131° F. The solution showed definite signs of protein degradation as indicated by the ammonia smell. However, the degree of hydrolysis was very limited, and when the pH was lowered, the protein precipitated, leaving a nearly-solid mass which was unworkable and not usable as a liquid preparation.

2. Alkaline Treatment with Enzymatic Hydrolysis. There was no evidence of ammonia after the alkaline treatment was completed. The 46 hour digestion with enzyme was more than sufficient to make a very liquid preparation suitable for use in a feed, fertilizer ingredient, or spray-dried solid product. There were some suspended solid materials, but there would be no difficulty in re-suspending these particles prior to use.

3. and 4. Enzymatic digestion only on homogenate and on chunks. There were two problems with this approach. (1) Water had to be added to facilitate the enzymatic process, and this would be economically unsound since it would have to be removed later. It would also be commercially unattractive because it would be expensive to transport, unless concentrated. (2) The degree of hydrolysis was insufficient, and there were too many insoluble particles after acidification to permit a suitable liquid for most uses.

EXAMPLE III

Liquefication of Chicken Feathers

In this example, chicken feathers, as obtained from the slaughterhouse, were frozen and held until they were processed. The procedure used was as follows:

1. 170 gm of frozen feathers, 100 gm of hot water, and 18 gm of 50% NaOH were heated together for one hour at 150° F.
2. The mixture was cooled to 105° F.
3. Water was added to replace the evaporative loss back to the original total weight.
4. The pH was adjusted to 9.8 with phosphoric acid and 300 mg of potassium sorbate was added.
5. One gram of alkaline protease was added (to make 0.33%).
6. Digestion was allowed to proceed for 20 hours in a 125° F. incubator overnight.
7. Results This procedure produced a material which contained suspended solids. While the solids settled readily, they were easily resuspended. The following effects were observed:

1. On acidification to pH 4, there was a slight tendency to form a sticky precipitate.
2. The color was yellowish-brown.

3. A smell of hydrogen sulfide was present.

The samples were than allowed to stand overnight, and were evaluated for amount of settling, percent of solids, and percent of protein in the clear supernatant. This was compared with an untreated control which did not settle. The results of these data are shown in Table 8.

TABLE 8

| Sample | % Clear Phase (Top) | % Bottom Clear Phase (ppf) | % Total Solids in Clear Phase | % Protein in Clear Phase |
|---|---|---|---|---|
| Untreated Control | — | — | 25.6[1] | 16.3[1] |
| Feathers - treated with alkaline, then enzyme | 60 | 40 | 19.5 | 10.7 |

[1]This is the total solids and % protein of an untreated feather suspension. No settling occured.

Discussion of Results

The results of this study, which were confirmed in a larger scale study, indicate that chicken feathers, which are a very resistant material, can be processed into a liquid suspension which is stable and which has characteristics which permit it to be used in this form, or would make it capable of being dried to a suitable new type of feather hydrolystate.

EXAMPLE IV

Comparison of the Combined Process Using the Two Commercially-Available Proteolytic Enzymes In this example, the commercially-available proteolytic enzyme, papain, was compared with the neutral protease of GB Fermentation Industries described in prior examples. Both were used in conjunction with an initial alkaline treatment.

In this example, sea perch with the fillets removed were used as the test tissue.

Procedure Followed 1. 450 gm of sea perch tissue was mixed with 27 gm of 50% sodium hydroxide and heated to 150° F. for one hour.
2. The liquefied mixture was neutralized to pH 8 with 10 gm of 75% phosphoric acid.
3. The resultant liquefied material was split into three parts, and potassium sorbate and the respective enzyme were added to each. Sample No. 1 had 150 mg sorbate and 300 mg of neutral protease (0.2%). Sample No. 2 had 150 mg sorbate and 300 mg of papain (0.2%). Sample No. 3 had 150 mg sorbate, 60 mg of papain (0.04%).
4. Enzymatic digestion was allowed to proceed for 20 hours at 131° F.
5. The materials were allowed to stand at ambient temperature in the laboratory for seven days as part of the evaluation for stability and the nature of the preparation.

Results

After six days of standing, the amount of clear supernatent was determined. The solids and the protein were determined on the clear supernatant. The results are summarized in Table 9.

TABLE 9

| Sample | Enzyme Level | % Clear Phase (Bottom) | % Turbid Phase (Top) | % Solid Phase (Bottom) | % Protein in Clear Phase |
|---|---|---|---|---|---|
| Control | — | — | — | 23.8 | 14.9 |
| No. 1 | neutral protease 0.2% | 35 | 65 | 20.8 | 12.1 |
| No. 2 | Papain 0.2% | 20 | 80 | 18.1 | 10.3 |
| No. 3 | Papain 0.04% | 5 | 95 | 19.8 | 10.3 |

Results and Conclusions

1. Both enzymes are satisfactory, but the neutral proteinase was highly superior to papain.
2. Neutral proteinase dissolved 81% of the protein, whereas papain dissolved 68%.
3. The viscosity of the preparation was lower after enzymatic treatment with the neutral proteinase than with papain.
4. There was a greater degree of completely soluble protein after neutral proteinase digestion than after papain digestion.
5. Even when papain was used at a level that cost many times that of the neutral proteinase, there was still an inferior performance.

EXAMPLE V

Evaluation of Preservative System

The preferred preservative system of this invention provides a synergistic effect between pH adjustment with acid addition in combination with certain carboxylic acids and their salts. This example demonstrates the synergism obtained in the present products.

The material used to demonstrate these effects is a beef intestinal preparation whose preparation is described below.

Preparation of Samples 1. 4200 gm of beef intestine were treated with 100 gm of 50% NaOH (2.4%) for 30 minutes at 155° F. Complete liquefication was achieved.
2. The resultant mixture was then cooled and neutralized with 53 (gm of $H_2SO_4$ (pH 8.2).
3. 2 gm of neutral proteinase were added and incubated for 2.5 hours with agitation. The digestion was continued for 3 days without agitation in a 50° C. oven.
4. 1150 gm of fat were removed by skimming.
5. The material balance in the two phases resulting were determined. The results are shown in Table 10.

TABLE 10

| | Material Balance | | | | | |
|---|---|---|---|---|---|---|
| Phase | Weight | % Solids | % Fat Solids | % Nonfat Solids | Weight of Fat | Nonfat Weight |
| (a) Top Phase | 1160 gm | 80.1 | 75.7 | 4.4 | 878 gm | 46 gm |
| (b) Aqueous Phase | 3100 gm | 35.2 | 26.2 | 9.0 | 812 gm | 279 gm |

TABLE 10-continued

| Phase | Weight | % Solids | Material Balance % Fat Solids | % Nonfat Solids | Weight of Fat | Nonfat Weight |
|---|---|---|---|---|---|---|
| (c) Total | 4260 gm | 47.3* | 39.7* | 7.6* | 1690 gm | 325 gm |

*Calculated 6. 1100 gm of the aqueous phase were used to prepare the samples (1-9) for the bacteriological evaluation.

TABLE 11

Levels of Preservatives in the Samples

| Sample No. | Description | pH | Preservative | Level | Temperature of Storage |
|---|---|---|---|---|---|
| 1 | Control | 8.1 | None | 0 | 70° F. |
| 2 | Acidified | 4.0 | None | 0 | 70° F. |
| 3 | Potassium Sorbate alone | 8.1 | K-Sorbate | 0.1% | 70° F. |
| 4 | Preserved with K-Sorbate | 4.0 | K-Sorbate | 0.1% | 100° F. |
| 5 | Preserved with K-Sorbate | 4.0 | K-Sorbate | 0.1% | 70° F. |
| 6 | Preserved with K-Sorbate | 4.0 | K-Sorbate | 0.1% | 35° F. |
| 7 | Preserved with Propionate | 4.0 | NaPropionate | 0.1% | 70° F. |
| 8 | Preserved with Propionate | 4.0 | NaPropionate | 1.0% | 70° F. |
| 9 | Preserved with Benzoate | 4.0 | NaBenzoate | 0.1% | 70° F. |
| 10 | Preserved with Sorbate | 4.0 | K-Sorbate | 0.1% | 70° F. |

7. The remaining aqueous aqueous phase was allowed to stand overnight. More fat from the aqueous phase was then removed.

8. It was then adjusted to a pH 4 with sulfuric acid and 0.1% potassium sorbate added (Sample No. 10 in Table 12).

9. The aqueous phase described in Table 11 was used in the model experiment reported in Table 12.

10. The zero time bacteria count was Sample No. 1 counted immediately after the enzymatic step was completed.

TABLE 12

Results of Bacteria Counts

| Sample No. | Preservative System | Liquid Prep. | Temp. of Storage | Count × $10^3$ 0 Time | 5 days | 9 days |
|---|---|---|---|---|---|---|
| 1 | None | #1 | 70° F. | 500 | 2200 | 8,000 |
| 2 | Acid only (pH 4) | #1 | 70° F. | 500 | 4000 | 150,000 |
| 3 | Potassium Sorbate only | #1 | 70° F. | 500 | 1600 | 62,000 |
| 4 | Potassium Sorbate, pH 4 | #1 | 100° F. | 500 | 0.1 | 1 |
| 5 | Potassium Sorbate, pH 4 | #1 | 70° F. | 500 | 4 | 0.6 |
| 6 | Potassium Sorbate, pH 4 | #1 | 35° F. | 500 | 1 | 3 |
| 7 | Propionic Acid (0.1%), pH 4 | #1 | 70° F. | 500 | 0.4 | 1 |
| 8 | Propionic Acid (0.1%), pH 4 | #1 | 70° F. | 500 | 0.2 | 0.1 |
| 9 | Sodium Benzoate, pH 4 | #1 | 70° F. | 500 | 0.5 | 0.6 |
| 10 | Potassium Sorbate, pH 4 | #2 | 70° F. | 500 | 0.1 | 0.2 |

Results and Conclusions

1. The control sample developed an offensive odor within one week and was completely spoiled in two weeks.

2. The addition of potassium sorbate alone has no effect on rate of spoilage.

3. Acidification of the aqueous phase alone has no effect on spoilage rate.

4. The three samples that spoiled had growth rate increases between 16-fold and 300-fold within two weeks.

5. At pH 4, 0.1% benzoate, 0.1% propionate, 1% propionate all worked well. All the bacteria counts were reduced 99.5% within one week.

6. The sorbate system is equally effective at three temperatures (35° F., 70° F. and 100° F.). This is a very surprising phenomenon. Most preservatives have different curves at different temperatures.

7. The sorbate system worked equally well in two different aqueous systems where the ratios of fat and protein varied.

8. Propionic acid, which is known as an anti-fungal preservative, shows a high degree of efficacy as an anti-bacterial in this system.

EXAMPLE VI

Preservative System

A pilot scale run was conducted. Liquefied fat protein solutions were prepared by the present alkaline treatment-enzyme hydrolysis process from:

(a) Fish—35-40 gallons
(b) Feather—35-40 gallons
(c) Poultry by-product—35-50 gallons
(d) Beef rounds—4 gallons Each was preserved with 0.1% sodium sorbate and a pH adjustment to 4.0 with sulfuric acid. 2 oz. samples were checked for pH and a bacteria count was made on each. (See Table 13).

TABLE 13

Bacteriological Data on Pilot Scale Samples After Ten Days Standing at 70° F.

| Description | pH | Bacteria Count |
|---|---|---|
| (1) Poultry liquid | 4.4 | 500,000/gm |
| (2) Fish liquid | 4.3 | 20,000/gm |
| (3) Feather liquid | 4.3 | 8,000/gm |
| (4) Clarified beef rounds liquid | 3.8 | 400/gm |

The pH of the first three was too high. An aliquot of each was titrated to 4.0 with sulfuric acid. The amount of acid necessary to lower the pH's of the entire batch of each liquid was calculated. The pilot scale samples were then further acidified and re-evaluated, bacteriologically, as follows:
(a) As is (pH Table 13)
(b) Acidified pilot scale to lower pH and evaluated
(c) Acidified lab scale to lower pH and evaluated After 20 more days of standing at 70° F., the different products were assayed. (See Table 14.)

TABLE 14

Bacterial Count on 3–30 Day Old Pilot Scale Products

| Description | pH | Count per ml |
|---|---|---|
| (1) Poultry | 3.9 | 1,000 |
| (2) Fish | 4.3 | 18,000 |
| (3) Feathers | 4.4 | 15,000 |
| Acidified Batch | | |
| (4) Poultry | 4.1 | 27,000 |
| (5) Fish | 4.0 | 2,100 |
| (6) Feathers | 4.2 | 2,000 |
| Acidified Lab Sample | | |
| (7) Poultry | 3.9 | 7,000 |
| (8) Fish | 3.9 | 400 |
| (9) Feathers | 3.8 | 700 |

Along with the bacteriological evaluation of the pilot scale runs, several other lab scale evaluations of proteins liquefied by the present process and preservation system were also assayed for bacteria levels. (See Table 15.)

TABLE 15

Bacteria counts on Different Preparations Stored at 70° F.

| No. | Description of Sample | pH | Count per gm | Age of Preparation at Time of Test |
|---|---|---|---|---|
| (1) | Cell Cream | 4.6 | 30,000 | 3 months |
| (2) | Fish | 4.6 | 400 | 3 months |
| (3) | Feathers | 4.2 | 700 | 3 months |
| (4) | Fish | 4.4 | 100 | 3 months |
| (5) | Fish | 4.3 | 100 | 3 months |
| (6) | Fish | 4.5 | 100 | 3 months |
| (7) | Cell Cream | 4.0 | 100 | 3 months |
| (8) | Beef Rounds | 3.7 | 200 | 1 month |

Conclusions

1. These results indicate that this preservative system is broad spectrum and effective at pH 4.2 or lower.
2. Propionic acid is highly effective in this system.

The studies of the following examples are a comparison of the invention of this application (Sawhill/Freeman process) with that of prior art U.S. Pat. No. 2,477,255 (Keil et al.).

EXAMPLE VII

Treatment of Animal Blood

Keil, et al., uses a low level alkaline hydrolysis carried out at high temperature to liquefy blood coupled with an enzymatic digestion. He then forms a proteinaceous foam stabilizer from this liquefied blood. Keil's conditions, described in Example #I, involved the use of sodium hydroxide (caustic soda) at 7.5% of the protein level (in this example, they are blood proteins). His conditions include up to 5 hours of treatment at a boiling temperature. Keil's claims are 1 to 5 hours for the time, and 3–9% for the caustic soda to protein ratio. Animal blood usually is 14% protein when collected at the slaughter house. This level is due to the water used in clean-up procedures.

Keil used pancreatin as his enzyme source. He did not specify the potency. At the time when Keil was doing this work, the 1940's, the pancreatins were either USP or 2×USP strength. Later, the USP was changed to NF. Pancreatin technology has improved since then.

4XNF pancreatins are the potency now offered by manufacturers. The cost of this enzyme is around $10 per pound. In these studies, the more potent form (4XNF) was used. The Sawhill/Freeman procedure uses a preferential enzyme, a bacterial neutral proteinase. This has a cost of about $4 per pound. The amounts used are about 25% of the amount of enzyme that Keil used. The potency of this material proteinase is given in completely different units than the Pancreatin 4XNF. Comparison of potency is not meaningful. In this evaluation, the level of enzyme used was kept constant. Keil used 3% of the protein level as the pancreatin level. Phosphoric acid was used instead of sulfuric acid for neutralization after the alkaline treatment. This was to ensure the presence of a buffer during the enzymatic hydrolysis step. This is desireable for both enzymes. Anion effects have not been demonstrated to be a factor.

The enzymatic step was carried out without agitation in lab studies by placing the material to be digested in a covered vessel in a 40° C. incubator.

Chemicals used in this experiment were reagent grade.

Keil brings the preparation to boiling after the enzymatic treatment to destroy the enzyme. This step was repeated in the comparison study. Several types of evaluations were performed on the final product of the process in each case. The evaluations include:

1. Viscosity determinations using a Brookfield Viscometer at several temperatures,
2. The resulting solutions were evaporated to see how far they could be concentrated and still be fluid enough to be pumped.

TABLE 16

Comparison of the Two Preparations

| Item and Step and Step No. | Process System Used | |
|---|---|---|
| | Keil et al Example #I | Sawhill/ Freeman Example #II |
| (1) Amount of Blood | 500 gm | 500 gm |
| (2) Wt. of 50% Caustic (NaOH) | 10 gm | 25 gm |
| (3) Temp. of Alkaline treatment | 205° | 170° |
| (4) Time at Temp. | 5 hrs. | 0.5 hrs. |
| (5) Initial pH | 11.6 | 12.4 |
| (6) Amount of Enzyme | 2 gm | 2 gm |
| (7) Acid of Neutralization | Phos. | Phos. |
| (8) Temp of Enzymatic Step | 40° C. | 40° C. |
| (9) Time of Enzymatic Step | 18 hrs | 20 hrs. |
| (10) Viscosity after Enzymatic Treatment | 100,000 cps | 500 cps |
| (11) Temp at Viscosity readings | 90° F. | 85° F. |

Laboratory Procedures Followed

Keil, Example #I

1. The blood and caustic soda were mixed with agitation and heated to 170° F. in a 1 liter stainless beaker.
2. The mixture was placed in a boiling water bath with a water condenser to minimize water loss.
3. The preparation was heated for 5 hours, then cooled, and the pH adjusted to 8 with 75% phosphoric acid.
4. The enzyme was added (Pancreatin 4XNF) and mixed for 15 minutes.
5. The mixture was placed in a 40° C. incubator overnight. A sample was taken for total solids determination.
6. Water was added to return the mixture to the original weight (about 30 gms).

7. The preparation was removed from the incubator the next day, cooled slightly, and the viscosity and temperature were determined.

8. The mixture was heated to 185° F. to inactivate the enzyme (viscosity determinations were made as the temperature was increasing).

9. A sample was taken for bacteriological stability at 70° F.

Sawhill/Freeman, Example #II

1. Caustic soda and the blood were thoroughly mixed. The pH was 12.4. The temperature was raised under agitation to 170° F. (Time required 15 minutes).

2. The mixture was held at 170° F. with agitation for 0.5 hours.

3. The mixture was then cooled, acidified using 75% phosphoric acid.

4. The enzyme (neutral proteinase) was added. The mixture was stirred for 15 minutes. A sample was taken for solids determination.

5. The mixture is a 1 liter beaker was covered to eliminate vapor loss and held in a 40° C. incubator overnight.

6. The next morning, the mixture was cooled slightly, and the viscosity was determined was a Brookfield Viscometer.

7. Water was added to original weight, then the mixture was transferred to a flask for vacuum concentration using a rotary evaporator with a hot water bath as a heat source.

8. When the mixture was one half the original volume, the viscosity was determined at two termperatures.

9. A sample was taken for bacteriological stability when held at 70° F.

Results

Percent Solids in Raw Blood

The two assays performed indicate the starting solids in the blood was 16%. Blood solids are 90% protein, so therefore the starting material contained 40% protein. The level of sodium hydroxide was therefore 7.5%, as in the Keils et al Example #I from his patent.

Viscosity Data

TABLE 17

| Temperature of Determination | Keil et al, Ex. #I @ 18% solids | Sawhill/Freeman @ 19% solids | @ 41% |
|---|---|---|---|
| 85, | — | less than 50 cps | — |
| 90, | 100,000 cps | — | 23,000 cps |
| 120, | 37,500 cps | — | — |
| 138, | — | — | 1,000 cps |
| 145, | 18,000 cps | — | — |
| 185, | 2,500 cps | — | — |

Although Keil's Example #I, according to his description in the patent, should be a liquid after the enzymatic step, the result from this study produced a very thick gelatinous mass with a viscosity over 100,000. Upon heating during the denaturations step, the gel started to liquify. At a temperature over 140° the liquid has a viscosity similar to molasses. This preparation could not be concentrated beyond the 18% solids level, although the patent claims it can be concentrated to 30% solids. This preparation at 18% solids was too viscous to use at temperatures below 140° F.

The Sawhill/Freeman preparation was completely liquid. When concentrated to one half original volume, there was an increase in solids to 41%. The concentrate contained no lumps, and at room temperature was a fluid capable of being pumped.

Conclusions

Keil, et al U.S. Pat. No. 2,477,255

Keil's procedure will liquify 16% solids blood. However, the resulting product at 100° F. was a gel which became liquid when the temperature was raised to more than 140°. There were some undissolved particles in the liquid.

Sawhill/Freeman

Blood processed using Sawhill/Freeman technology results in a high fluid, low viscosity liquid which contains no undissolved solids. This product can be concentrated to over 40% solids and was a pumpable liquid at 85° F.

EXAMPLE VIII

Comparison of Keil, et al to Sawhill/Freeman (S/F) Technologies on Heads, Feet and Viscera of Chickens The same procedures were utilized as those in the experiments with blood and with cell cream. The sodium hydroxide to protein ratio and the enzyme to protein levels followed those in Example #I of Keil. In his claims there is one to five hours of processing. In our study four hours were used. The preparations consisted of heads, feet and viscera to give a representative composite of a large scale supply of the material. Based upon our past experience, this should contain 8-10% protein and 8-12% fat.

TABLE 18

| Materials and Conditions | Keil et al | S/F |
|---|---|---|
| (1) Tissue | 600 gm | 650 gm |
| (2) 50% NaOH | 3 gm | 3 gm |
| (3) Phosphoric and (75%) to adjust pH to enzymatic pH | 4 gm | 16 gm |
| (4) Enzyme level | .6 gm | .6 gm |
| (5) Time of alkaline treat. | 4.0 hrs | 0.5 hrs |
| (6) Temp. of alkaline treat. | 205° F. | 170° F. |
| (7) pH of alkaline step | 10.2 | 12.6 |
| (8) pH of enzymatic step | 7.8 | 7.8 |

Chicken wastes were obtained from a chicken processing company. The tissue was stored frozen and held until needed, at −20° F. The tissue was quickly thawed in warm water for the experiment. The Kiel procedure utilized a 215° F. oven as the heat source during the alkaline treatment.

The evaluation consisted of three parts. After the enzymatic step, both preparations were passed through a 16 mesh screen. The undigested portion retained on the screen was weighed, and the percent of total tissue digested was calculated from this.

Each preparation was acidified to see if there was any protein precipitated, and this amount was estimated. The third evaluation consisted of total solids for the digested material to identify the disposition of the total solids.

Keil, et al Procedures

1. The sodium hydroxide and tissue were mixed together and heated on a hot water bath.

2. The temperature was raised to 170° F. It was then transferred to the 215° F. oven for a total of four hours.

3. The preparation was cooled and acidified to pH 7.8 with phosphoric acid.

4. Enzyme (Pancreatin) was added and stirred until the enzyme appeared to be dispersed. A regular agitator could not be used because of the large amount of non-liquefied solids.

5. The preparation was placed in a 100° F. incubator for overnight digestion.

6. The next morning the preparation was screened. Solids were determined on the material passing through the screen, and the pH of the filtrate was adjusted to 3.6 with phosphoric acid.

S/F Procedure

1. Sodium hydroxide was added to the tissue and the material was put on a hot water bath.

2. When the temperature had reached 140° F. most of the tissue was in apparent solution. Agitation was started and the temperature raised to 170° F.

3. The temperature was maintained at 170° F. for 30 minutes with stirring.

4. The preparation was cooled, the pH adjusted to 8 with phosphoric acid.

5. The enzyme was added (NP 200) and stirred for 15 minutes to insure proper mixing.

6. The preparation was digested overnight at 100° F. in an incubator.

7. The preparation was run through a screen the next morning, the solids were determined on the filtrate, and the filtrate was adjusted to pH 3.6.

TABLE 19

| | | Screening Results | | | |
|---|---|---|---|---|---|
| SN# | Procedure Used | Starting Weight | Filtrate | Cake | Filtrate Yield |
| 1 | S/F procedure | 700 gm | 672 gm | 28 gm | 96% |
| 2 | Keil procedure | 610 gm | 323 gm | 287 gm | 53% |

Notes on Results of the Screening Procedure

The materials on the screen in the S/F procedure consisted of bones and bone fragments. None of these were over ¼″ in diameter.

The residue from the Keil procedure, after screening, contained whole feet and other whole tissues, in many cases essentially intact.

TABLE 20

| | Solids in the Filter Portion of Each Procedure | | | |
|---|---|---|---|---|
| SN# | Process Used | % Solids | % Solids due to aud. base | Corrected % Solids |
| 1 | S/F Prep. | 35.6% | 4.1% | 31.5% |
| 2 | Keil Prep. | 31.8% | 1.0% | 30.8% |

The essential identity of the identical nature of the solids indicates that that part which is digested shows a total percent solids equivalent to the initial tissue itself.

Acidification

Upon acidification, neither preparation had any significant dropout or other problem.

Conclusion

1. The Keil procedure solubilizes about half the tissue. It appears to be most effective on the soft tissues of the viscera and was relatively ineffective on the head, harder tissues like the heart, etc.

2. The Sawhill/Freeman procedure produced almost complete liquefication with a solution which was well preserved on the acid side.

EXAMPLE IX

Comparison of the Keil Procedures with the Sawhill-Freeman Procedures on Cell Cream Cell cream is a single cell protein with a cell membrane that is difficult to digest and to disrupt. It, therefore, is not very useful nutritionally to non-ruminants. The preparation was described in greater detail in the original patent application.

In the following experiment, the conditions followed were those used in Example #I of the Keil patent. The method of evaluation of the degree of digestion in this case involved centrifugation of the digests after the second (enzymatic) step. Cells that were not digested will show as a sediment. Keil used Pancreatin and the S/F procedure used the neutral proteinase. The same concentration of enzymes and identical pH's were used for enzymatic digestion. All the chemicals used in this study were AR grade.

Centrifugation was performed in an International centrifuge at approximately 1500 rpm for five minutes. In this study, a preparation was used using much less enzyme, in accordance with the claims of the patent, and therefore the S/F procedure was used at two enzyme levels, the Keil at one.

TABLE 21

| Ingredients and Conditions | S/F Exp. #I | S/F Exp. #II | Keil, et al Exp. #I |
|---|---|---|---|
| 1. Cell Cream (spray dried) | 100 | 100 | 100 |
| 2. Water | 600 | 600 | 600 |
| 3. 50% Caustic Soda (NaOH) | 28 gm | 28 gm | 13 gm |
| 4. 75% Phos. Acid | 8 gm | 8 gm | 3 gm |
| 5. Enzyme level | 0.7 gm | 3.0 gm | 3.0 gm |
| 6. pH of Alkaline treat. | 12.3 | 12.5 | 10.2 |
| 7. Time of Alkaline treat. | 0.5 hrs | 0.5 hrs | 5 hrs |
| 8. Temp. of Alkaline treat. | 170° F. | 170° F. | 198° F. |
| 9. pH of Enzymatic Digest. | 7.8 | 7.6 | 7.8 |
| 10. Time of Enzymatic Dig. | 24 hrs | 23 hrs | 18 hrs |

Keil, et al Procedure

1. The cell cream, caustic soda and water were mixed and the temperature raised to 170° F.

2. The mixture was covered and held in a boiling water bath for 5 hours. The temperature was checked every hour.

3. The water was added back to the original water because of loss. It was then cooled and neutralized to approximately 8 enzymatic digestion.

4. The enzyme was pancreatin 4×NF. This was agitated for 15 minutes and then allowed to incubate.

5. This was placed in incubator for overnight digestion to complete the step.

6. The sample was centrifuged to determine the degree of digestion.

7. A control consisting of 10 gm of cell cream and 60 gm of water was used for comparison with both preparations.

Sawhill/Freeman Procedure

1. The cell cream, caustic soda and water were mixed and the temperature raised to 170° F.

2. It was stirred at 170° F. for half an hour.

3. The preparation was cooled and acidified to pH 8.

4. The enzyme (NP 200) was added at two levels and stirred until fully dispersed.

5. The mixture was placed in incubator overnight to complete the enzymatic step.

6. Samples were centrifuged to determine the degree of digestion.

Data (Results)

TABLE 22

| SN# | Description of Preparation | Top Phase | Bottom Phase |
|---|---|---|---|
| 1 | Control | 30 ml | 20 ml |
| 2 | S/F #I | 39 ml | 11 ml |
| 3 | S/F #II | 41 ml | 9 ml |
| 4 | Keil, et al | 3/ml | 19 ml |

TABLE 23

| Percent of Cell Cream that was Fully Liquefied | |
|---|---|
| S/F #I | 45% |
| S/F III | 55% |
| Keil, et a. | 5% |

Based upon prior experience, it would appear that the S/F procedure might have benefited from a longer alkaline hydrolysis. Nevertheless, the difference with the Keil procedure is very striking.

Conclusions

1. The Keil procedure will not digest the cell cream.
2. The S/F procedure at the enzyme level will digest slightly more than half of the cell cream.
3. The S/F procedure, using 25% as much enzyme as Keil, will almost achieve 50% of the cell cream.
4. Pancreatin 4XNF costs 2.5 times as much as neutral proteinase. Even if it had worked, the digestion via the Sawhill/Freeman procedure would cost perhaps 10% of the Keil procedure. This generalization applies to all of the steps that might be used.

We claim:

1. A process for liquefying the protein in a protein source selected from animal tissue and single cell microorganisms comprising the steps of:
   (a) heating an aqueous slurry of said source at an initial pH above 12 and at a temperature of about 120°-170° F. for a period sufficient to cause cell rupture and protein denaturation and thereby facilitate enzyme hydrolysis of the protein structure to smaller, more soluble molecules;
   (b) and then hydrolyzing said source to liquefy the protein therein by heating said slurry at about 100°-140° F. at an alkaline pH in the presence of an effective amount of bacterial proteolytic enzyme selected from alkaline and neutral enzymes.

2. The process for liquefying protein in accordance with claim 1 wherein said step (a) is executed for a time ranging from just bringing the slurry up to 120°-170° F. and immediately proceeding with step (b) to holding the slurry at 120°-170° F. for 120 minutes.

3. The process for liquefying protein in accordance with claim 1 wherein said step (a) is executed in about 5-60 minutes at a temperature of about 140°-160° F. and a pH of about 12-13 and said step (b) is executed at a temperature of about 115°-125° F.

4. The process for liquefying protein in accordance with claim 3 wherein said step (a) is executed in about 20-40 minutes.

5. The process for liquefying protein in accordance with claim 2 wherein said steps (a) and (b) together are executed in not more than about 24 hours.

6. The process for liquefying protein in accordance with claim 1 wherein the enzyme of step (b) is a high alkali protease and is added at the end of step (a) at the pH then existing in the slurry.

7. The process for liquefying protein in accordance with claim 1 wherein the pH is lowered at the end of step (a) by the addition of mineral acid before adding the enzyme of step (b) to a pH which facilitates hydrolysis by said enzyme.

8. The process for liquefying protein in accordance with claim 7 wherein the pH is lowered to about 8-9 with the addition of an acid selected from hydrochloric acid, phosphoric acid and sulfuric acid.

9. The process for liquefying protein in accordance with claim 7 wherein the enzyme of step (b) is a neutral protease.

10. The process for liquefying protein in accordance with claim 6 wherein a plurality of enzymes are successively introduced as hydrolysis of said source progresses, each successive enzyme added being selected for its activity at successively lowered pH's of the slurry caused by increased liberation of carboxyl groups of the protein.

11. The process for liquefying protein in accordance with claim 1 wherein the pH of step (a) is adjusted to about 12-13 by the addition of about 1-5 weight percent of said source of a base relative to said aqueous slurry selected from sodium hydroxide, potassium hydroxide and ammonium hydroxide.

12. The process for liquefying protein in accordance with claim 1 wherein the enzyme of step (b) is present in an amount of about 0.1-1.0 weight percent of said source.

13. The process for liquefying protein in accordance with claim 1 and including the further step (c) of adding a preservative to the hydrolysate of step (b).

14. The process for liquefying protein in accordance with claim 12 wherein the pH of the hydrolysate of step (b) is adjusted to about 4.2 or less and said preservative comprises about 0.05-1.0 weight percent of solids of at least one substantially nontoxic carboxylic acid or substantially nontoxic salt thereof, said carboxylic acid being selected from solid unsaturated aliphatic carboxylic acids and aromatic carboxylic acids.

* * * * *